United States Patent [19]

Ray et al.

[11] Patent Number: 4,972,913
[45] Date of Patent: Nov. 27, 1990

[54] FRONT BUMPER ASSEMBLY FOR A TRUCK

[75] Inventors: Bob Ray, Fremont; Huston Marlowe, Orinda, both of Calif.

[73] Assignee: Paccar Inc., Bellevue, Wash.

[21] Appl. No.: 244,798

[22] Filed: Sep. 15, 1988

[51] Int. Cl.$^5$ ............................................. B62D 33/06
[52] U.S. Cl. .............................. 180/69.21; 180/89.17; 293/118; 293/121; 293/155
[58] Field of Search ................ 180/89.14, 89.16, 89.19, 180/69.21, 89.17, 89.18, 69.2; 293/115, 117, 118, 120, 121, 155

[56] References Cited

U.S. PATENT DOCUMENTS

| | | | |
|---|---|---|---|
| D. 163,279 | 5/1951 | Harris | D14/3 |
| 2,699,223 | 1/1955 | Brumbaugh | 180/89.17 |
| 2,740,487 | 4/1956 | Murty et al. | 180/89.14 |
| 2,769,501 | 11/1956 | Wagner | 180/68.6 |
| 3,217,354 | 11/1965 | May | 16/128 |
| 3,282,368 | 11/1966 | Pittera | 180/53.6 |
| 3,792,889 | 2/1974 | Fuener et al. | 293/63 |
| 3,844,369 | 10/1974 | Schroeder et al. | 180/89.14 |
| 3,935,920 | 2/1976 | Schiel | 180/68.6 |
| 4,109,485 | 8/1978 | Groeskopf | 62/298 |
| 4,141,427 | 2/1979 | Kirchweger et al. | 180/89.14 X |

OTHER PUBLICATIONS

CONCO International Trucks.
IVECO-Presseschau.

Primary Examiner—Charles A. Marmor
Assistant Examiner—Michael Mar
Attorney, Agent, or Firm—Flehr, Hohbach, Test, Albritton & Herbert

[57] ABSTRACT

A truck of the cab-over-engine type is disclosed herein and includes a cab mounted over the truck engine and many of the engine's cooperating components for pivotal movement between an upstanding, operating position and a titled, maintenance position. The truck also includes a frontal nose hood mounted to and in front of the cab for its own pivotal movement between a closed, generally vertical operating position and a tilted, open position for gaining access to certain ones of the components cooperating with the engine. A front bumper assembly is provided in front of the nose hood and includes a first bumper arrangement connected for pivotal movement with and forming part of the frontal nose hood and a second bumper arrangement maintained in a fixed position and unconnected with the first bumper arrangement, whereby when the frontal nose hood and first bumper arrangement are pivoted to an open position, the second bumper arrangement remains in a fixed position. In the actual embodiment shown herein, the first bumper arrangement is comprised of a number of integrally formed plastic sections while the second bumper arrangement consists of the frontmost cross member of the truck's chassis frame.

14 Claims, 2 Drawing Sheets

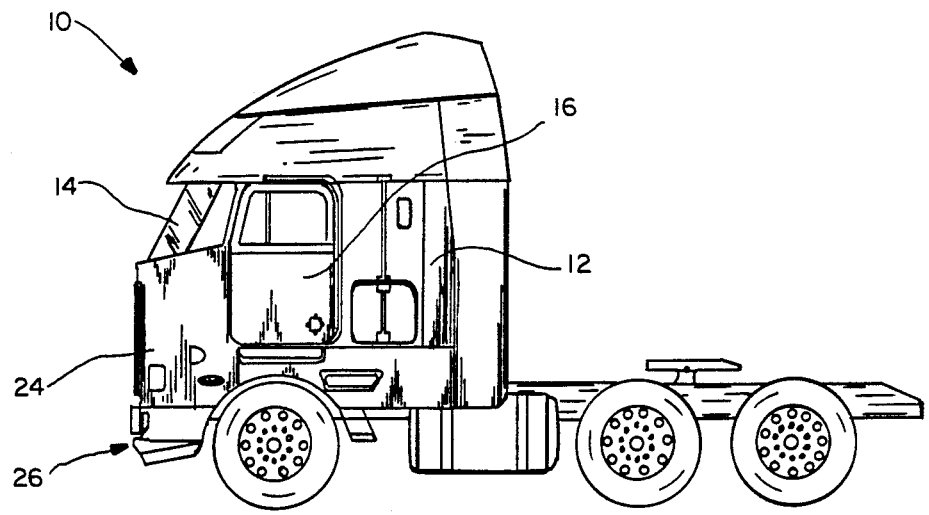
FIG.—1
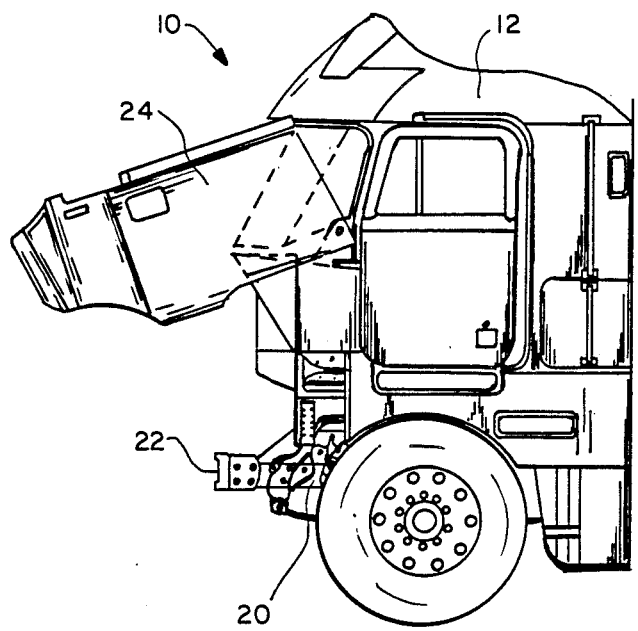
FIG.—3

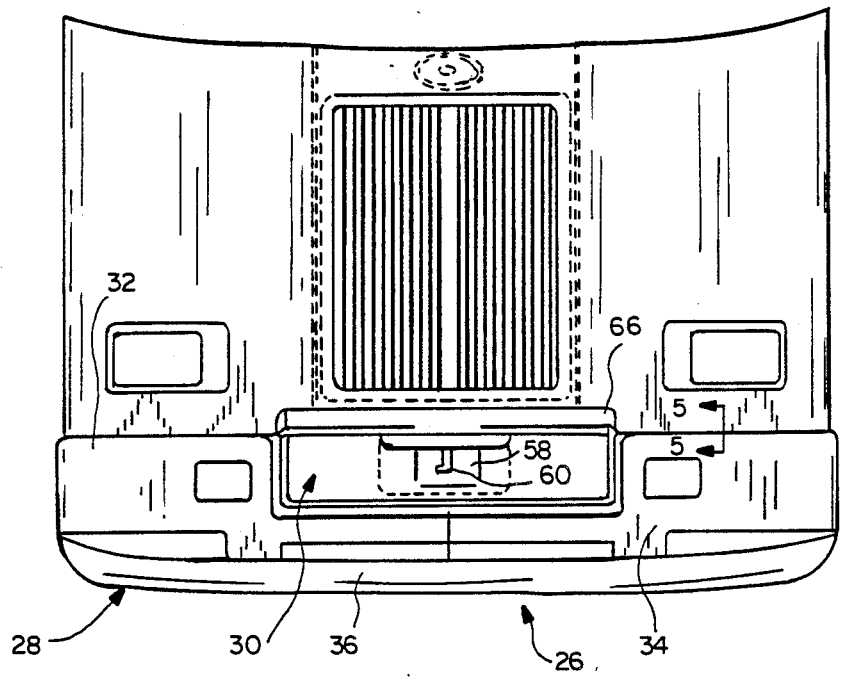
FIG.-4
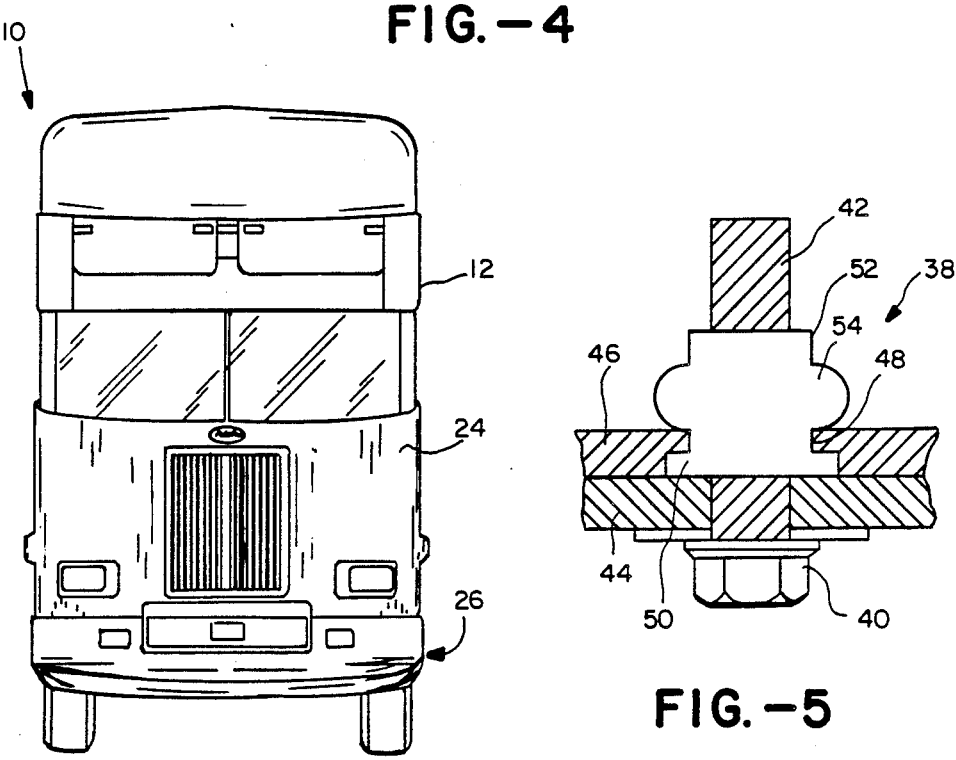
FIG.-2
FIG.-5

FRONT BUMPER ASSEMBLY FOR A TRUCK

The present invention relates generally to trucks, especially those of the cab-over-engine (COE) type, and more particularly to a specifically designed bumper assembly especially suitable for use with a COE type truck. The bumper assembly itself is an improvement over the bumper assembly disclosed in United States patent application Ser. No. 244945, filed Sept. 15, 1988, now U.S. Pat. No. 4,921,062 and entitled CAB-OVER-ENGINE TRUCK INCLUDING INTEGRATED NOSE HOOD (attorney docket A-44963), which application is assigned to the same assignee as the present application. This copending application is incorporated herein by reference.

A typical truck of the cab-over-engine type known in the prior art includes a cab which is mounted over the truck's engine and many of the engine's cooperating components for pivotal movement between an upstanding, operating position and a tilted, maintenance position. In the above recited copending patent application, a similar COE type truck is disclosed including a frontal nose hood mounted to and in front of the cab for its own pivotal movement between a closed, generally vertical operating position and a tilted, open position, for gaining access to certain components cooperating with the truck's engine. This frontal nose hood includes an integrated bumper assembly which moves with it. The bumper assembly, as disclosed in the copending application, may be integrally formed with the rest of the nose hood as a unitary member, or it may be a separate integrally formed member disengagably connectable with the rest of the nose hood.

As will be described in more detail hereinafter, the present invention relates specifically to a truck of the cab-over-engine type and specifically to an improved front bumper assembly which includes two separate bumper arrangements. The first one of these arrangements is connected for pivotal movement with and forms part of the frontal nose hood while the second bumper arrangement is maintained in a fixed position unconnected with the first bumper arrangement. In this way, when the frontal nose hood and first bumper arrangement are pivoted to an open position, the second bumper arrangement remains in its fixed position.

In accordance with one specific feature of the present invention, the second, fixed bumper arrangement is constructed of a structurally stronger material than the first bumper arrangement and extends a further distance forward than the first bumper arrangement, whereby it serves to shield the first bumper arrangement against minor front end collisions. In a preferred and actual working embodiment of the present invention, the truck disclosed herein includes a chassis frame having a frontmost crossed member which serves as the second bumper arrangement.

In accordance with another feature of the present invention, the first or pivotal bumper arrangement forming part of the overal front bumper assembly is separate and distinct from and disengagably connectable to the rest of the frontal nose hood. In this way, it can be readily replaced if damaged without having to replace the whole frontal nose hood. In addition, as will be seen, specifically configured connecting means are provided so as to release the first bumper arrangement from the rest of the nose hood without damaging the latter in the event the first bumper arrangement is subjected to a substantial impact.

These and other features of the present invention will be described in detail hereinafter in conjunction with the drawings wherein:

FIG. 1 is a side elevational view of a cab-over-engine truck having a front bumper assembly designed in accordance with the present invention;

FIG. 2 is a frontal elevational view of the truck illustrated in FIG. 1;

FIG. 3 is a side elevational view of the truck shown in FIG. 1, but illustrating its frontal nose hood and part of its bumper assembly in a raised position;

FIG. 4 is an enlarged front elevational view of the nose hood and front bumper assembly of the truck illustrated in FIG. 1; and FIG. 5 is a sectional view of a detail of the front bumper assembly, taken generally along lines 5—5 in FIG. 4.

Turning now to the drawings, wherein like components are designated by like reference numerals throughout the various figures, a cab-over-engine (COE) truck is shown in FIGS. 1-3 and generally designated by the reference numeral 10. This truck includes a cab 12 having the various components a cab of a COE truck would be expected to have including but not limited to front windshield 14, opposite side doors, one of which is shown at 16, and so on. The cab is mounted over the truck engine (not shown) and many of the engine's cooperating components including its radiator for movement between an upstanding, operating position illustrated in FIGS. 1-3 and a tilted maintenance position (not shown), as described in the above recited copending patent application. The various components cooperating with the engine, besides the radiator, are known in the art and, hence, will not be set forth herein.

Still referring to FIGS. 1-3, cab 12 is mounted to the truck's chassis which is generally indicated at 20 and which includes a frontmost cross member 22 (see FIG. 3). Overall COE truck 10 also includes a frontal nose hood 24 which is generally U-shaped and wraps around the front, sides and front of cab 12 in the manner described in the above recited copending application. As also described in that application, the nose hood is mounted to the cab for pivotal movement between the closed, generally vertical operating position illustrated in FIGS. 1 and 2 and a tilted, open position for gaining access to certain ones of the components cooperating with the truck's engine, as shown in FIG. 3.

Referring specifically to FIG. 4 in conjunction with FIGS. 1-3, attention is directed to a front bumper assembly 26 which comprises part of overall COE truck 10 and which is designed in accordance with the present invention. This bumper assembly includes one bumper arrangement 28 and a second separate and distinct bumper arrangement 30. As will be seen below, bumper arrangement 28 is connected with and forms part of overall frontal nose hood 24 and therefore pivotally moves with the nose hood between its closed and opened positions. As will also be seen below, bumper arrangement 30 remains in a fixed position, unconnected with bumper arrangement 28, so that when this latter arrangement and the frontal nose hood pivot between opened and closed positions, bumper arrangement 30 remains stationary.

In the embodiment illustrated in the figures, bumper arrangement 28 is comprised of three separate and distinct sections, top-side sections 32 and 34 and the bottom section 36. Sections 32 and 34 are preferably integrally formed from plastic material, specifically ABS, while section 36 is preferably formed from a rubber material, specifically EPDM. As illustrated best in FIG. 1 in conjunction with FIG. 4, sections 32 and 34 extend from the center axis of the truck at its front end to the left and right sides of the truck and wrap around the latter along with nose hood 24 in order to present an aerodynamic, drag-reducing front face. The very front faces of these sections define a generally rectangular cutout which, as will be seen hereinafter, serves to accommodate bumper arrangement 30. Bumper section 36 extends adjacent to and below the entire combined bottom edges of bumper sections 32 and 34 and serves to further enhance the aerodynamics.

Bumper section 36 is disengagably connected to bumper sections 32 and 34 in any suitable manner, for example by means of bolts or other such fastening devices. Bumper sections 32 may also be disengagably connected to nose hood 24 in any suitable manner, for example by means of bolts. However, in accordance with a specific feature of the present invention, those bumper sections 32 and 34 are connected to the nose hood by means of specifically configured bolt assemblies. One of those assemblies is illustrated in FIG. 5 at 38. Assembly 38 includes a bolt 40 having a threaded shaft 42 which extends through cooperating openings in the top bumper flange section 44 and an adjacent flange section 46 of the nose hood. The opening 48 in flange section 46 is configured to accommodate the segment 50 of a well-nut 52. Enlarged segment 54 of the well-nut sits behind section 46. A number of these assemblies are utilized along the adjacent flange sections 44 and 46, on opposite sides of bumper arrangement 30. In the event bumper arrangement 28 is subjected to a substantial impact, the bolt assemblies adjacent the impact will move with the bumper arrangement, causing the well-nut to be pulled through opening 48 and thereby releasing the bumper arrangement from nose hood 24 before the latter can be damaged.

The advantage of providing three separate and distinct bumper sections for overall bumper arrangement 28 is that, in the event, one of these sections is damaged, it can be replaced without having to replace the whole bumper arrangement or, for that matter, the whole bumper assembly. However, it is to be understood that the present invention does contemplate use of more or less than three sections including, for example, a single integrally formed bumper arrangement.

Returning to FIG. 3 in conjunction with FIG. 4, attention is now directed to bumper arrangement 30. In accordance with the present invention, this bumper arrangement is comprised of the frontmost cross member 22 of overall chassis 20. It is preferably constructed of steel which, of course, is structurally stronger material than the plastic material which makes up bumper sections 32 and 34 in a preferred embodiment. As illustrated in FIG. 4, this cross member fills substantially the entire space between the upper segments of bumper sections 32 and 34. As best illustrated in FIG. 1, this cross member or bumper arrangement extends a further distance forward than any of the sections of bumper arrangement 28. In this way, bumper arrangement 30 serves to shield bumper arrangement 28 against minor front end collisions.

While the frontmost cross member of chassis 20 preferably serves as bumper arrangement 30, the present invention is not limited to this. Bumper arrangement 30 could be provided by an entirely different cross member suitably mounted to the cab, preferably its chassis, so long as it is structurally stronger than bumper arrangement 28 and protrudes further forward in the manner illustrated.

Still referring to FIG. 4, bumper arrangement 30 preferably includes a forward facing, centrally located recess 58 which contains a tow hook 60.

Returning to FIG. 1, in conjunction with FIG. 4, it should be noted that nose hood 24 includes its own cutout 66 just above bumper arrangement 30. This cutout is sufficiently wide to allow a trucker to use the top of arrangement 30 as a stepping surface to pull himself up in order to wash front windshield 14. As described in the above recited copending application, a hand grip is provided at the top of the nose hood for this purpose.

What is claimed is:

1. In a truck of the cab-over-engine type including a cab mounted over the truck engine and many of the engine's cooperating components for pivotal movement between an upstanding, operating position and a tilted, maintenance position, the improvement comprising:
    (a) a frontal nose hood mounted to and in front of said cab for pivotal movement between a closed, generally vertical operating position and a tilted open position for gaining access to certain ones of said components cooperating with the engine; and
    (b) a front bumper assembly including
        (i) first bumper means connected for pivotal movement with and forming part of said frontal nose hood, said first bumper means including a pair of bumper sections defining opposite sides of the overall bumper assembly and a bumper skirt defining the bottom edge of said overall bumper assembly and
        (ii) second bumper means maintained in a fixed position and unconnected with said first bumper means, whereby when said frontal nose hood and said first bumper means are pivoted to said open position, said second bumper means remains in its fixed position, said second bumper means being centrally located between said pair of bumper sections and extending a further distance forwardly than said first bumper means when said frontal nose hood and said first bumper means are in said closed position.

2. The improvement according to claim 1 wherein said truck includes a chassis frame having a frontmost cross member and wherein said frontmost cross member serves as said second bumper means.

3. The improvement according to claim 1 wherein said second bumper means is constructed of a structurally stronger material than said first bumper means.

4. The improvement according to claim 1 wherein said first bumper means includes means for disengagably connecting said first bumper means to the rest of said nose hood.

5. The improvement according to claim 4 wherein said connecting means includes a plurality of fastening arrangements configured to release the first bumper means from said nose hood without damaging the latter in the event said first bumper means is subjected to a substantial impact.

6. The improvement according to claim 5 wherein each of said fastening arrangements includes a bolt extending through adjacent segments of said first bumper means and said nose hood and a well-nut threaded around the bolt.

7. The improvement according to claim 4 wherein each of said bumper sections being disengagably connected with said nose hood.

8. The improvement according to claim 7 wherein said first bumper means includes means for disengagably connecting said bumper skirt to said pair of bumper sections.

9. The improvement according to claim 8 wherein said second bumper means is constructed of a structurally stronger material than said bumper sections and skirt whereby to shield said bumper sections and said skirt against minor front end collisions.

10. The improvement according to claim 9 wherein said truck includes a chassis frame having a frontmost cross member and wherein said frontmost cross member serves as said second bumper means.

11. The improvement according to claim 10 wherein said frontmost cross member includes a forward facing opening and a tow hook mounted within said opening.

12. The improvement according to claim 11 wherein said first-mentioned connecting means includes a plurality of fastening arrangements configured to release the pair of bumper sections and said bumper skirt from said nose hood without damaging the latter in the event said pair of bumper sections and said hood are subjected to a substantial impact.

13. The improvement according to claim 12 wherein said nose hood and said second bumper means are configured to provide a space therebetween, whereby the top of said second bumper means serves as a stepping surface for a trucker to reach the front windshield of the truck.

14. The improvement according to claim 3 wherein said frontmost cross member includes a forward facing opening and a tow hook mounted within said opening.

* * * * *